(12) United States Patent
Johnsen et al.

(10) Patent No.: US 6,533,616 B2
(45) Date of Patent: Mar. 18, 2003

(54) DSX JACK INCLUDING SLIDING REAR CONNECTOR

(75) Inventors: David J. Johnsen, New Hope, MN (US); Scott K. Baker, Richfield, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/835,067

(22) Filed: Apr. 13, 2001

(65) Prior Publication Data

US 2002/0151221 A1 Oct. 17, 2002

(51) Int. Cl.[7] .............................................. H01R 24/04
(52) U.S. Cl. ........................ 439/668; 439/173; 439/248
(58) Field of Search ................................ 439/668, 246, 439/247, 248, 188, 544, 578, 580, 545, 731, 152, 170, 171, 173, 534

(56) References Cited

U.S. PATENT DOCUMENTS

| | | | | |
|---|---|---|---|---|
| 4,588,251 A | * | 5/1986 | Newton ....................... | 439/638 |
| 5,233,501 A | * | 8/1993 | Allen et al. ................. | 439/733 |
| 5,413,494 A | * | 5/1995 | Dewey et al. ............... | 439/188 |
| 5,497,444 A | | 3/1996 | Wheeler ....................... | 385/135 |
| 5,582,525 A | * | 12/1996 | Louwagie et al. .......... | 439/668 |
| 5,746,617 A | * | 5/1998 | Porter, Jr. et al. .......... | 439/248 |
| 5,885,112 A | | 3/1999 | Louwagie et al. .......... | 439/719 |
| 5,913,701 A | * | 6/1999 | Olson et al. ................. | 439/668 |
| 5,938,478 A | * | 8/1999 | Werner ........................ | 439/668 |
| 6,116,961 A | * | 9/2000 | Henneberhger et al. .... | 439/668 |

FOREIGN PATENT DOCUMENTS

FR             931 803       *  3/1948

* cited by examiner

*Primary Examiner*—Tulsidas Patel
(74) *Attorney, Agent, or Firm*—Merchant & Gould P.C.

(57) ABSTRACT

A connector assembly and method, the assembly having a housing which defines a connector window. A connector is disposed within the window. The connector is slidable between a first and second position relative to the housing. The assembly may include a carriage for receiving one or more connectors. The carriage slides with the connectors between first and second positions. The assembly may include means for retaining the carriage and connectors in a selected position relative to the housing.

18 Claims, 11 Drawing Sheets

FIG.10
FIG.11
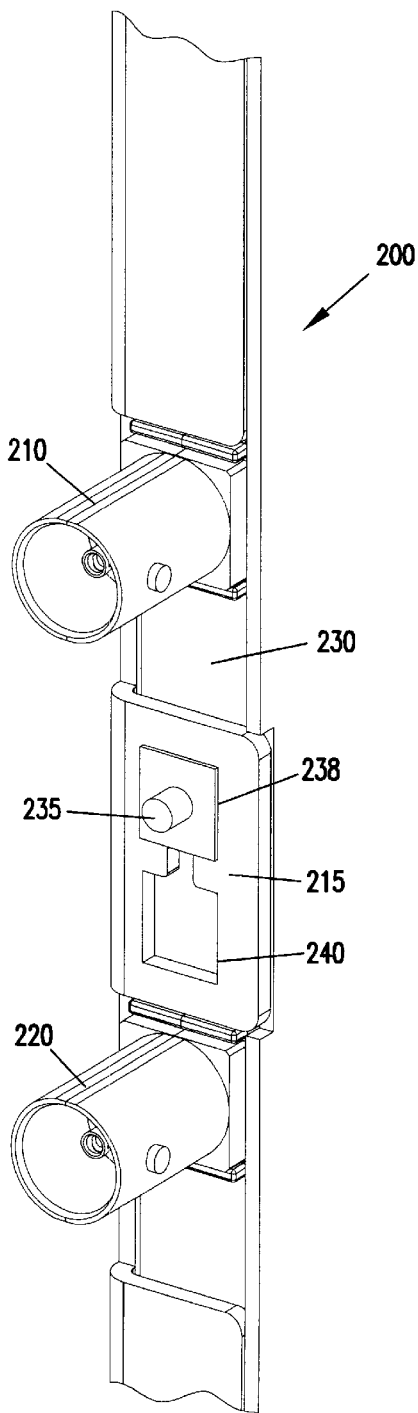
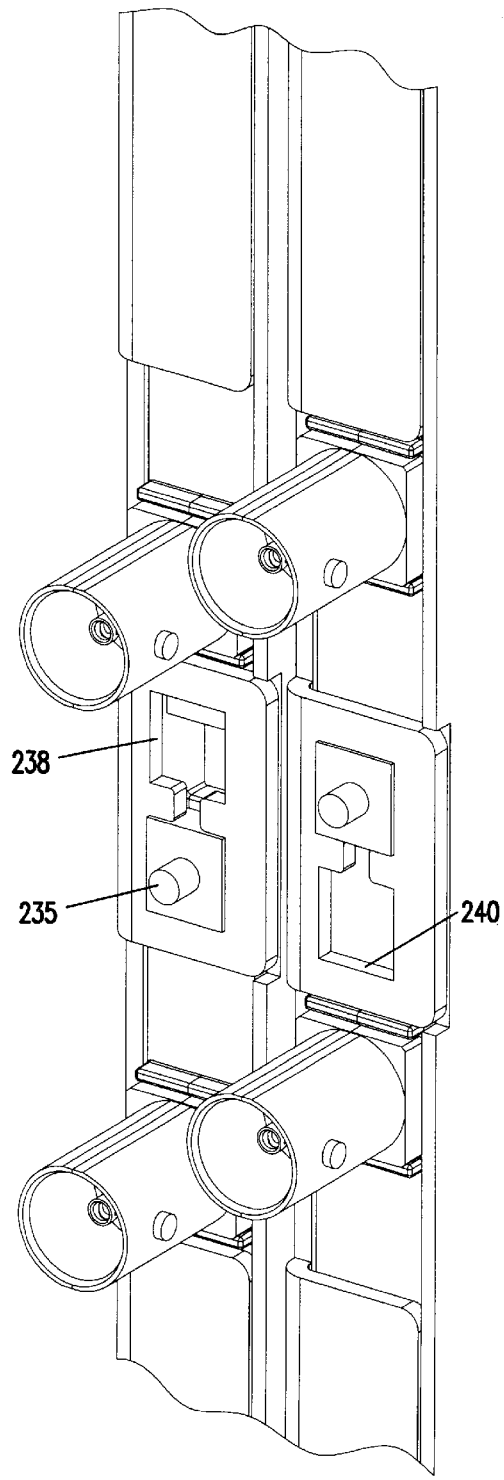

FIG. 12
FIG. 13
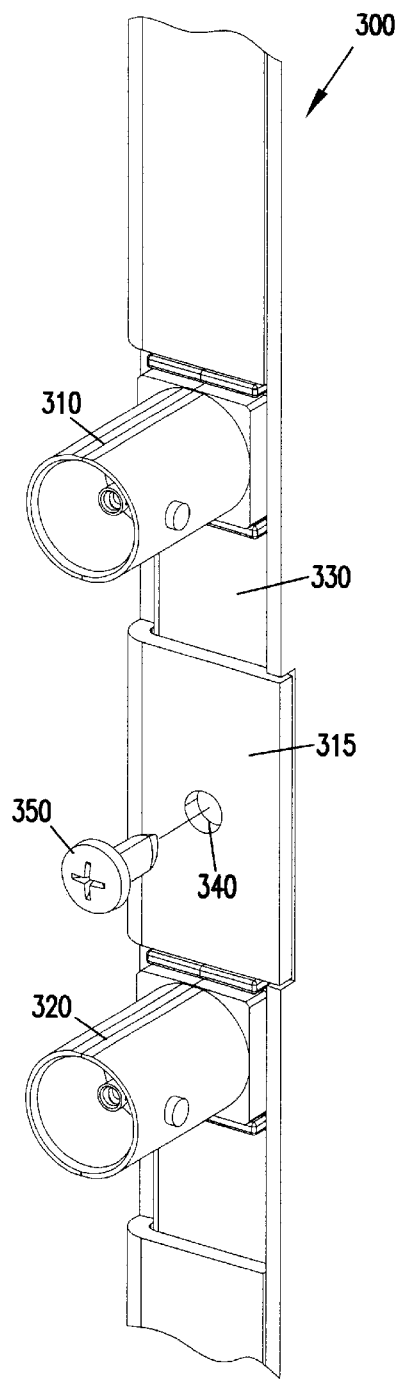
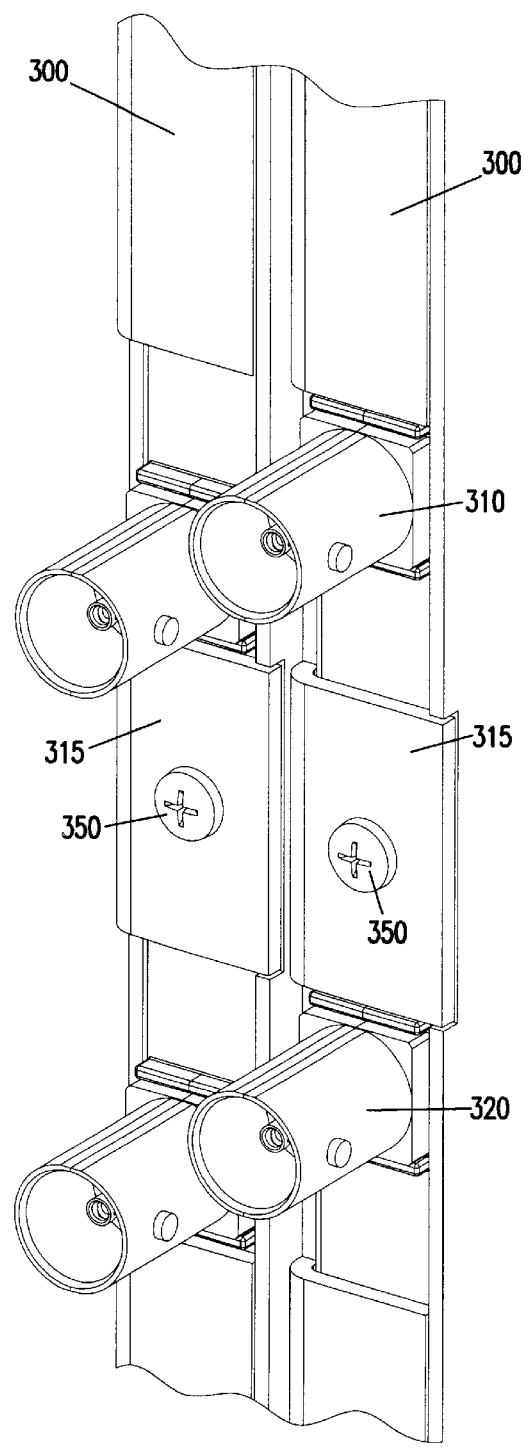

FIG. 14
FIG. 15
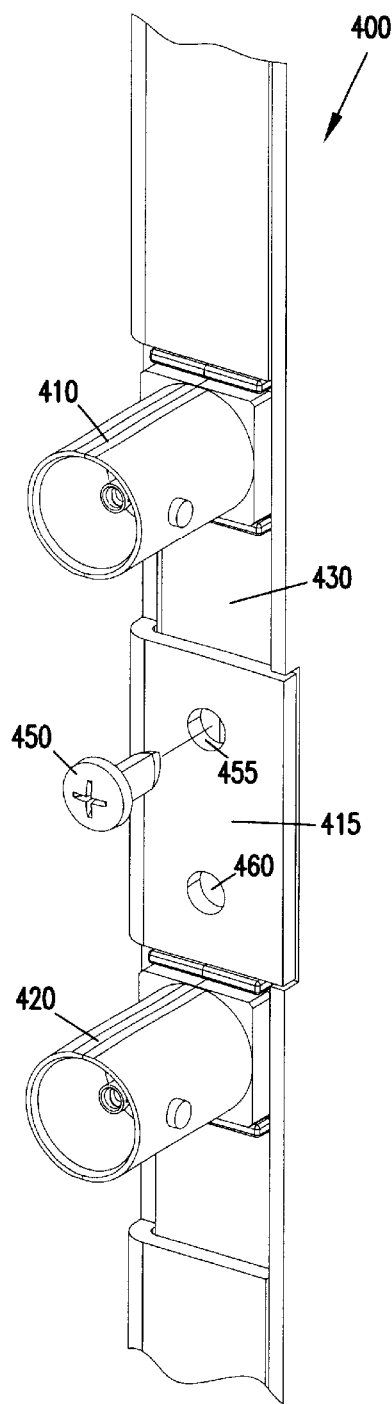
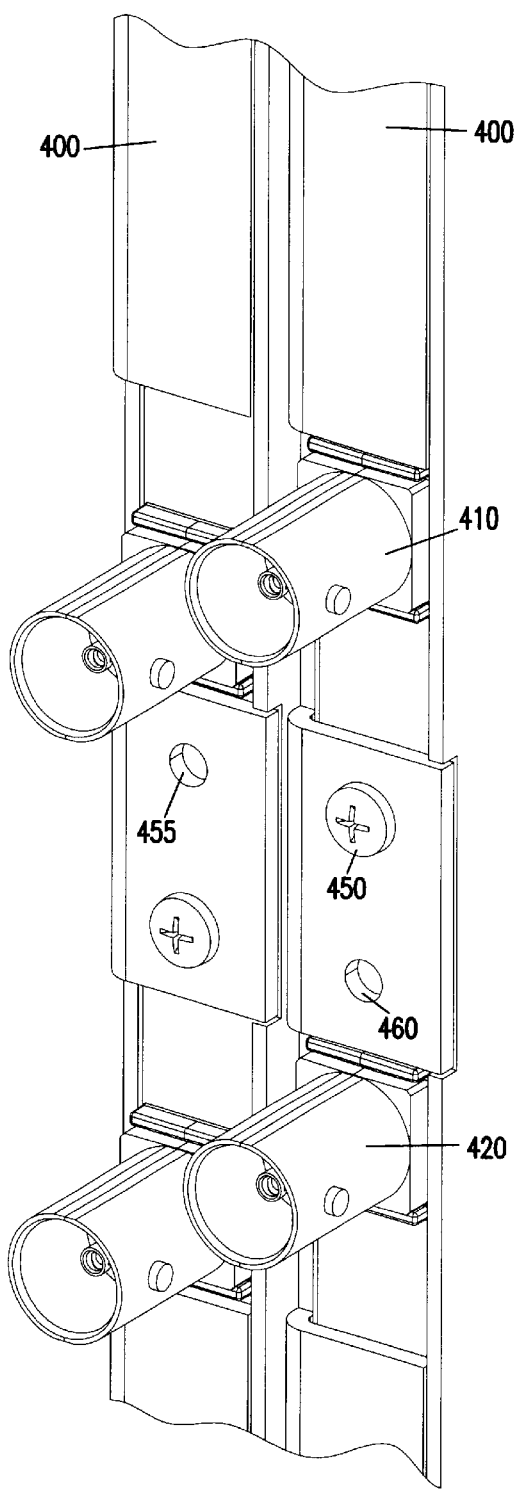

FIG. 16
FIG. 17
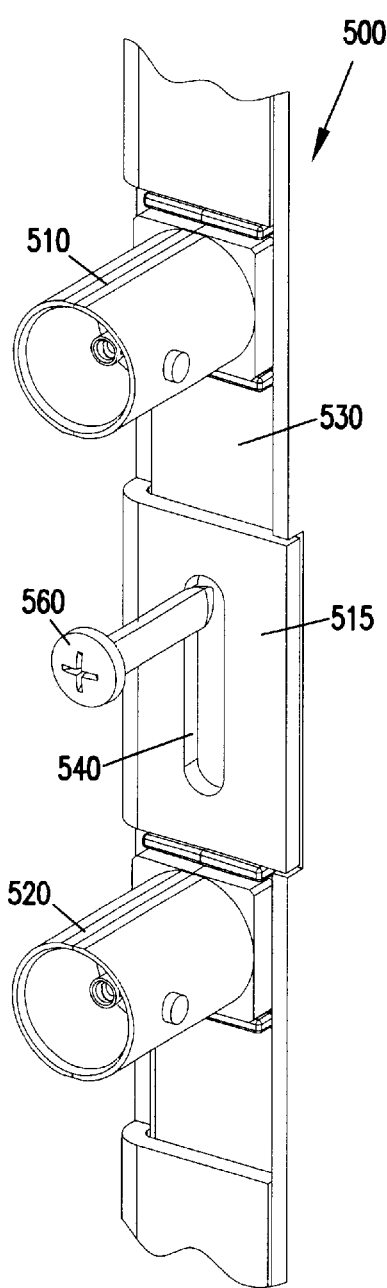
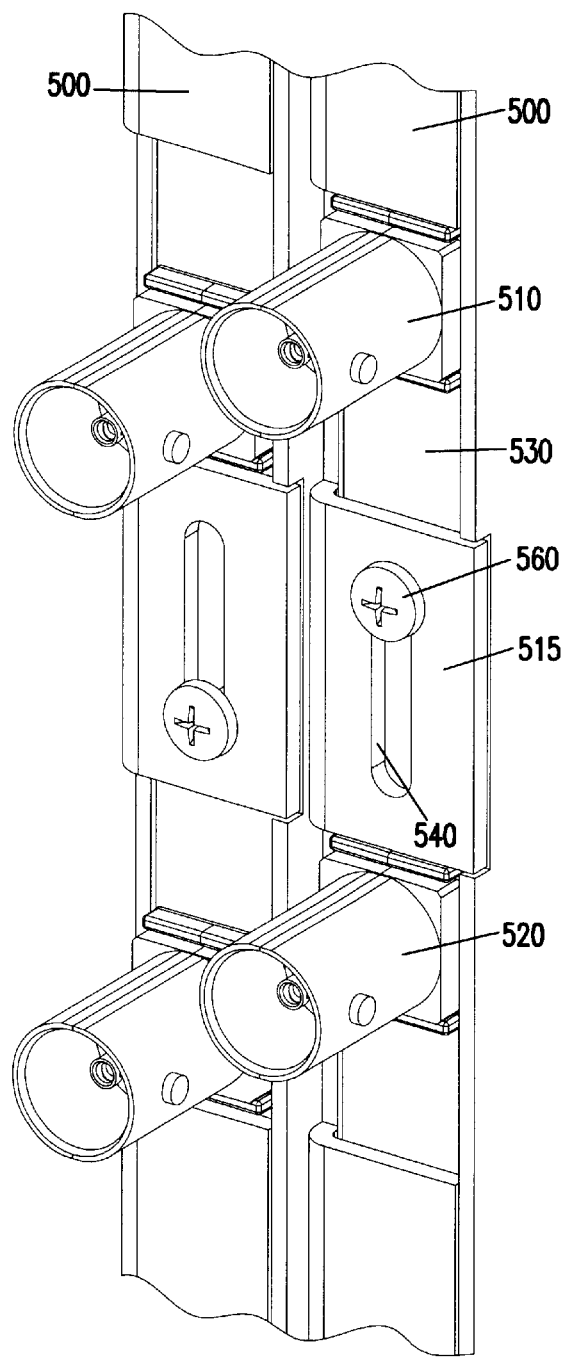

FIG. 18
FIG. 19
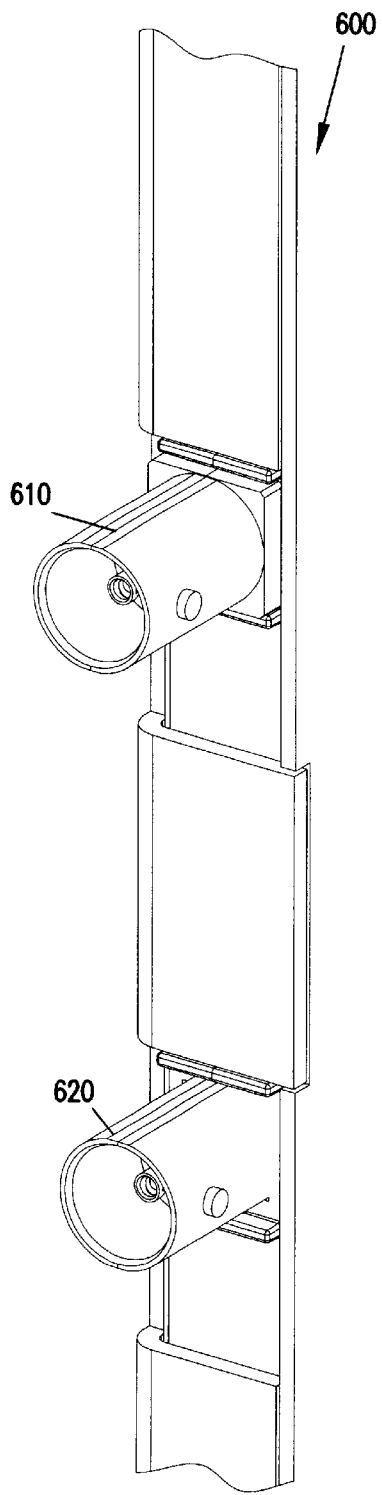
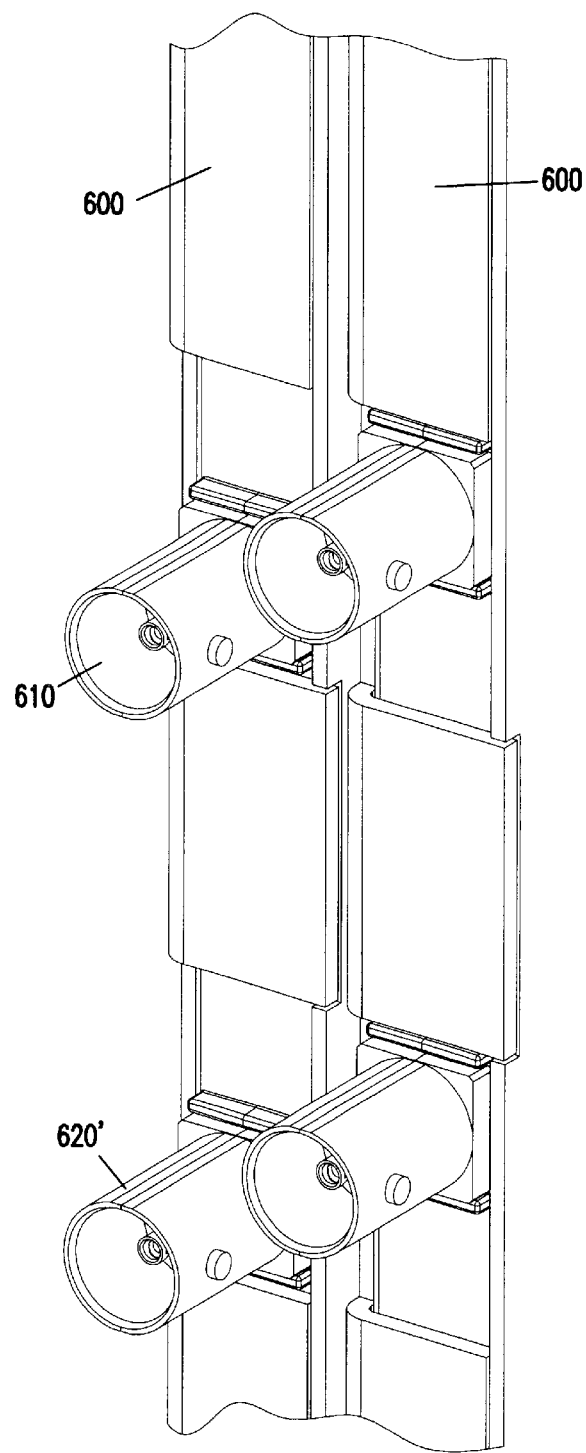

DSX JACK INCLUDING SLIDING REAR CONNECTOR

FIELD OF THE INVENTION

The present invention relates to telecommunications connectors. More specifically the present invention relates to connectors mounted in jack modules or equipment panels.

BACKGROUND OF THE INVENTION

Telecommunications equipment typically includes large numbers of cables connected to equipment panels or modules mounted in chassis systems. In order to make the most efficient use of available space, equipment panels have increasingly become more densely populated with connectors for securing cables thereto, and cable connector modules have become increasingly smaller to fit more connector locations within one chassis.

One factor which limits the density of connectors in telecommunication equipment is the outside dimension of mating connectors on the ends of the cables which must be connected to the connectors in equipment panels or modules. If the connectors in the panel or module are spaced too closely together, it becomes difficult to fit the mating connectors side-by-side over the panel connectors. To avoid this problem, prior systems have employed staggered connector panels or have designed two different connector modules with different arrangements of the connectors so that when the two different modules are placed next to each other in an alternating arrangement, a staggered pattern of connectors is achieved. This method, however, requires the manufacturer to make two different modules, and requires the user to purchase two different modules. There is a need for a simple, efficient means to densely populate connector panels or modules with connectors, yet still allow sufficient space for accessing the connector during cable installation and for receiving densely spaced mating connectors.

SUMMARY OF THE INVENTION

One aspect of the present invention relates to a connector assembly having a planar surface which defines a connector window lying in a first plane. The assembly includes a connector received in the connector window. The connector is slidable between first and second positions within the connector window parallel to the first plane.

Another aspect of the present invention relates to a carriage which receives the connector. The carriage is slidable with the connector between first and second positions relative to the connector housing. The carriage may include means for retaining the carriage in a selected position. The means for retaining the carriage may include depressible tabs or other elements having edges to oppose the connector housing. The carriage may also include guiderails to be received in guide-slots of the connector housing to guide the carriage between first and second positions.

Another aspect of the present invention relates to a carriage assembly including two opposed carriage members defining recesses. The carriage members include means for joining the carriage members in a mating arrangement, thereby trapping a plurality of connectors between the carriage members in the recesses. The connectors may include collars for preventing axial movement of the connectors relative to the carriage. The carriage may also include a depressible tab.

An additional aspect of the present invention relates to a connector assembly having first and second opposed panels. The first opposed panel includes a plurality of ports, and the second panel includes a plurality of slidable connectors which are electrically connected to the ports. The ports may include cross-connect ports, monitoring ports, and access ports. The circuit connecting the ports and the connectors may be a switching circuit.

A further aspect of the present invention relates to a method for arranging a plurality of connectors into a staggered arrangement including the steps of placing two connector housings having slidable connectors adjacent one another, and sliding one connector into a different position. The connector could be slid before the modules are placed adjacent each other.

BRIEF DESCRIPTION OF THE DRAWINGS

FIG. 10 is a partial perspective view of a first alternative embodiment of a connector assembly according to the present invention.

FIG. 11 is a partial perspective view of two adjacent connector assemblies according to the embodiment of FIG. 11.

FIG. 12 is a partial perspective view of a second alternative embodiment of a connector assembly according to the present invention.

FIG. 13 is a partial perspective view of two adjacent connector assemblies according to the embodiment of FIG. 12.

FIG. 14 is a partial perspective view of a third alternative embodiment of a connector assembly according to the present invention.

FIG. 15 is a partial perspective view of two adjacent connector assemblies according to the embodiment of FIG. 14.

FIG. 16 is a partial perspective view of a fourth alternative embodiment of a connector assembly according to the present invention.

FIG. 17 is a partial perspective view of two adjacent connector assemblies according to the embodiment of FIG. 16.

FIG. 18 is a partial perspective view of a fifth alternative embodiment of a connector assembly according to the present invention.

FIG. 19 is a partial perspective view of two adjacent connector assemblies according to the embodiment of FIG. 18.

DETAILED DESCRIPTION

The present invention relates to jack modules or other telecommunications equipment which include connectors which may be selectively positioned between at least first and second positions by sliding the connectors within a connector housing. Referring now to FIGS. 1–4, a set 10 of four jack modules 100 are shown. The modules 100 would typically be mounted by fasteners 20 at flanges 22 to a panel, chassis or rack system side-by-side as shown. Modules 100 are configured so as to increase the density of cable jacks that can be achieved in any given amount of space. In order to achieve a high density of jacks, the connectors at the rear of the jack modules are arranged in a staggered pattern. This allows sufficient room for connectors on the ends of cables to fit around the connectors of the modules without blocking adjacent connectors. Although the preferred embodiment described herein incorporates the present invention into a switching jack module, it is to be understood that the sliding connectors of the present invention could be used on a variety of other telecommunications equipment surfaces having connectors mounted therein.

Figure 1:
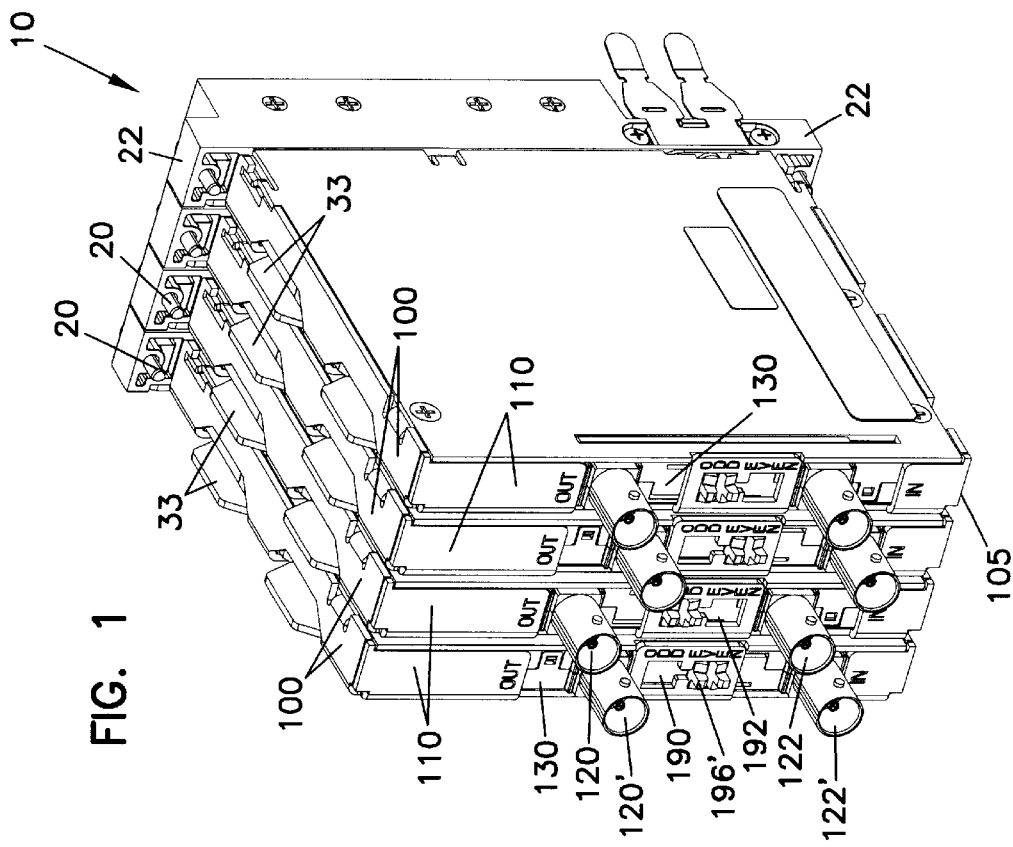
FIG. 1 is a rear perspective view of four jack modules with sliding rear connectors according to the present invention.
Figure 2:
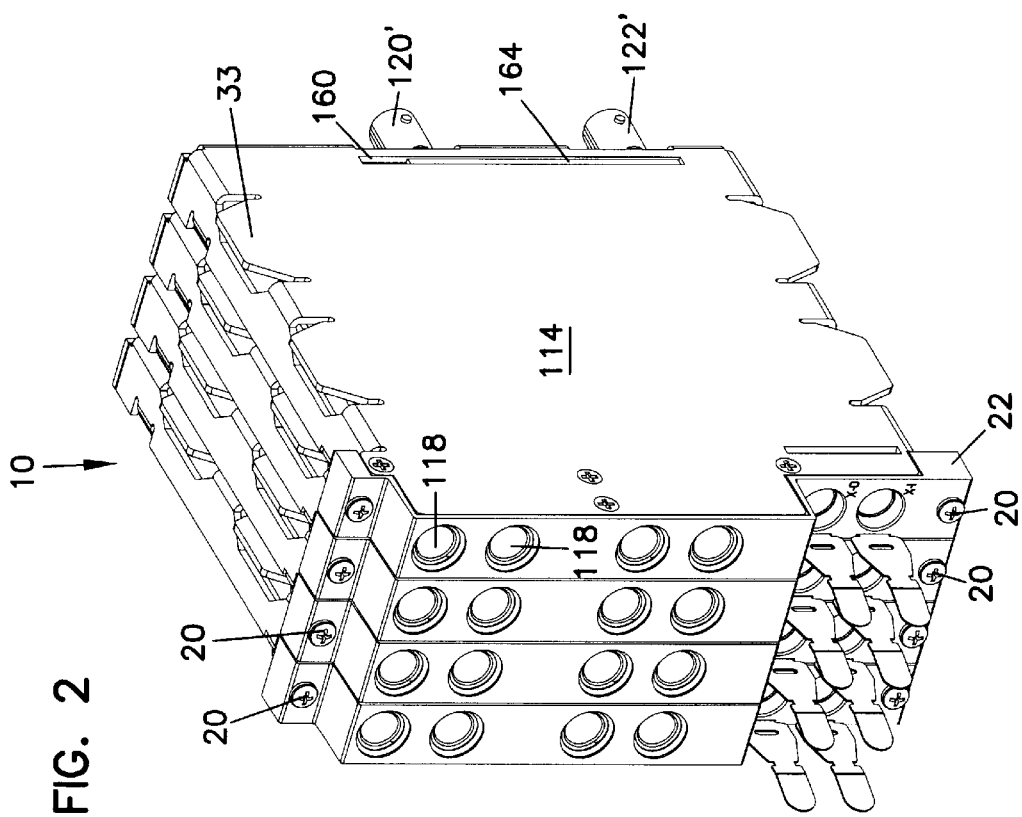
FIG. 2 is a front perspective view of the modules of FIG. 1.
Figure 4:
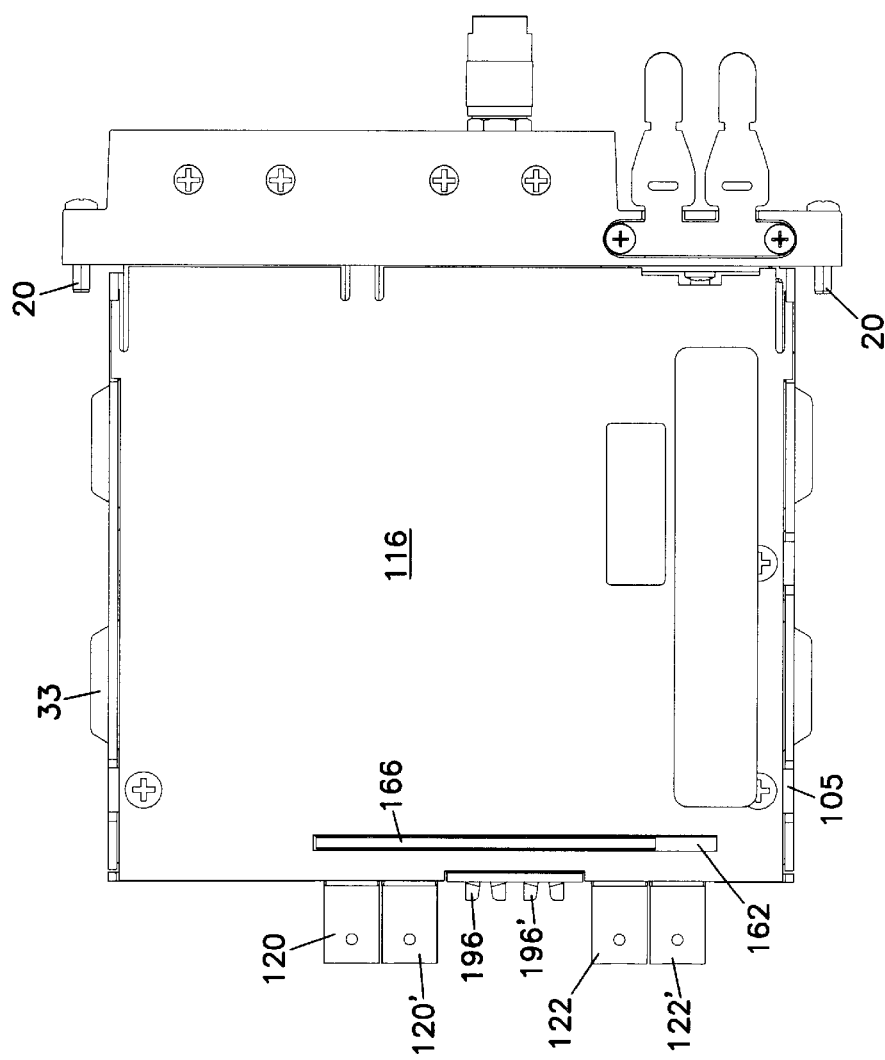
FIG. 4 is a side view of the modules of FIG. 1.
Figure 3:
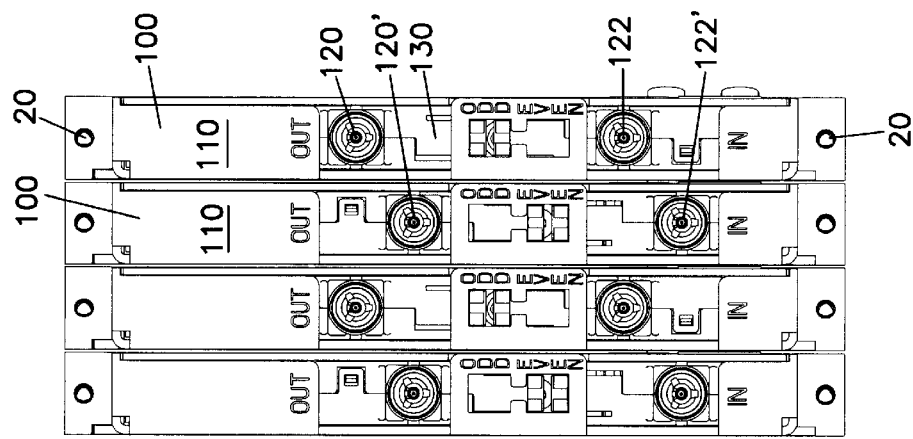
FIG. 3 is a rear view of the modules of FIG. 1.

Each module 100 includes a connector housing 105 having a rear surface 110. Module 100 includes two connectors 120 and 122. Connectors 120 and 122 are received in carriage 130. Connectors 120 and 122 along with carriage 130 slide within the connector housing 105 between first and second positions. Connectors 120 and 122 are shown in first positions. Connectors 120' and 122' are shown in second positions. By alternating the positions of adjacent connectors a staggered pattern can be achieved as shown in FIGS. 1 and 3.

Figure 5:
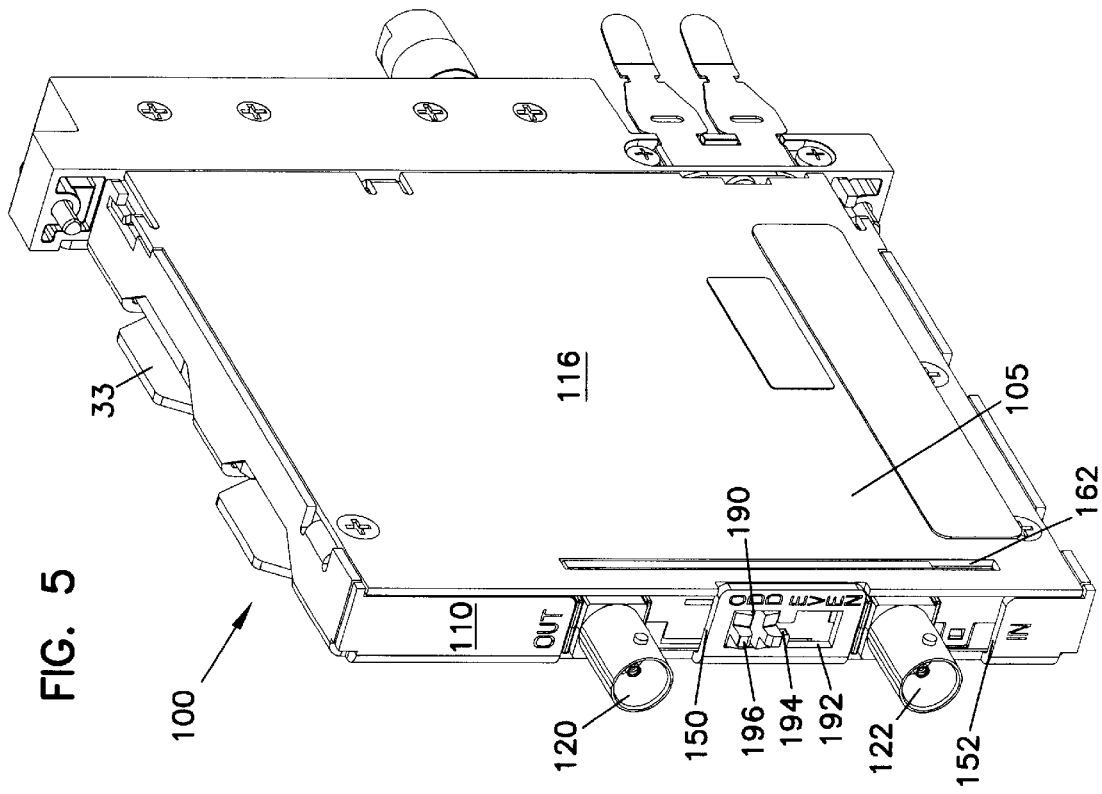
FIG. 5 is a rear perspective view of a jack module with sliding rear connectors according to the present invention.
Figure 7:
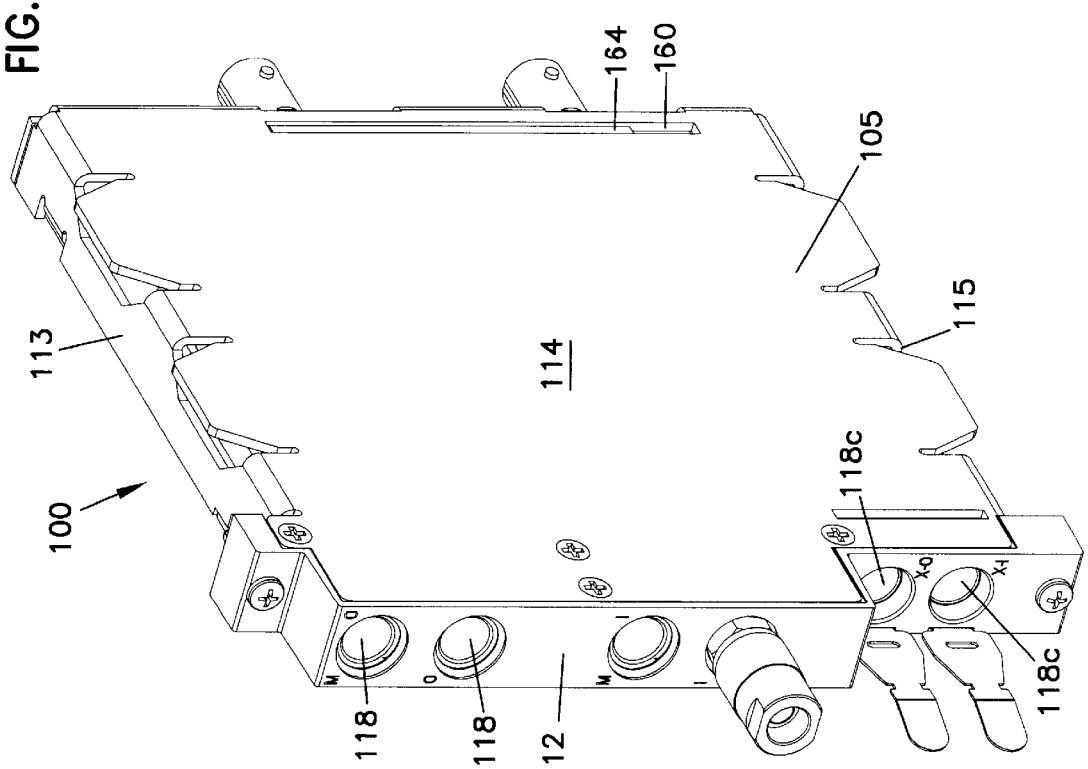
FIG. 7 is a second front perspective view of the module of FIG. 5.
Figure 6:
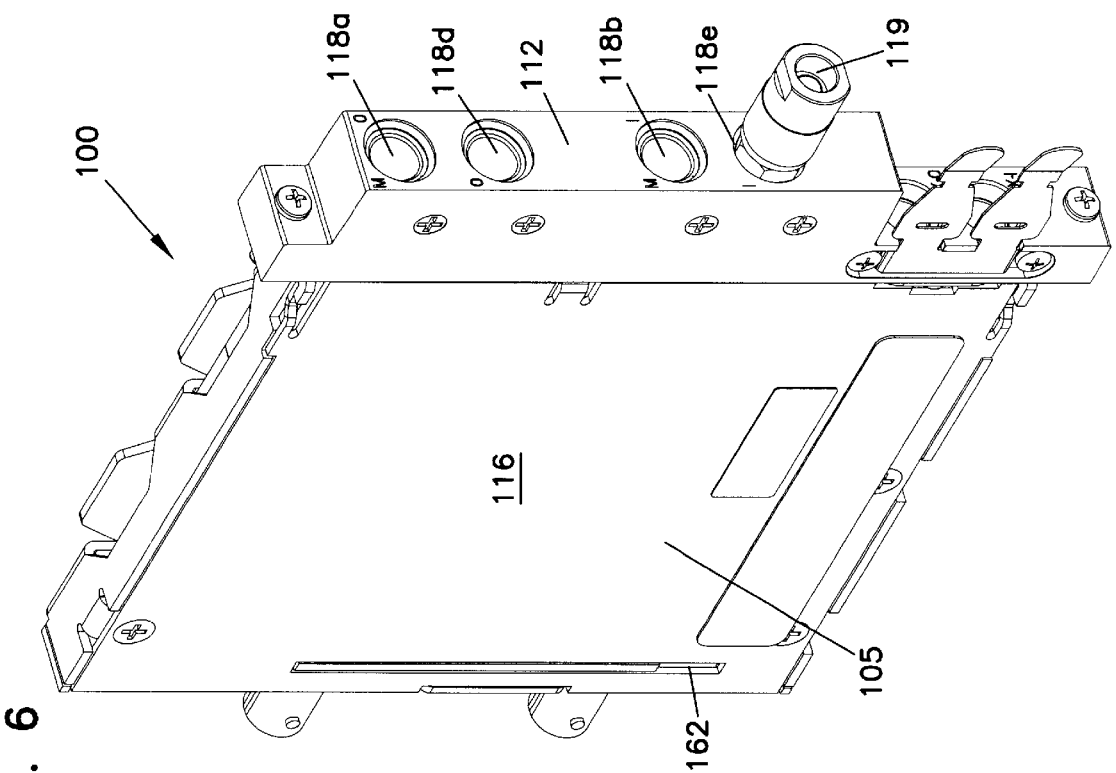
FIG. 6 is a first front perspective view of the module of FIG. 5.

Referring now to FIGS. 5–7, a single jack module 100 is shown incorporating sliding connectors 120 and 122. Connectors 120 and 122 are BNC style connectors in the illustrated embodiment. The module 100 includes a housing having a rear surface 110, a front surface 112, top and bottom surfaces 113 and 115, and two side surfaces 114 and 116 which define a module interior. The modules may include edgewise extensions 33 along the top for assisting insertion of the modules into a chassis or panel. The rear surface defines connector windows 150 and 152. Connectors 120 and 122 are received in the connector windows 150 and 152. The front surface 112 may define a plurality of connectors such as ports 118 which are electrically connected to connectors 120 and 122 by an electric circuit within the module interior. The ports 118 may include monitor ports 118a and 118b, cross connect ports 118c, and access ports 118d and 188e (IN and OUT ports). A plug 119 commonly used for connecting a cable to the access ports 118 is shown in port 118e in FIGS. 6 and 7.

Figure 6A:
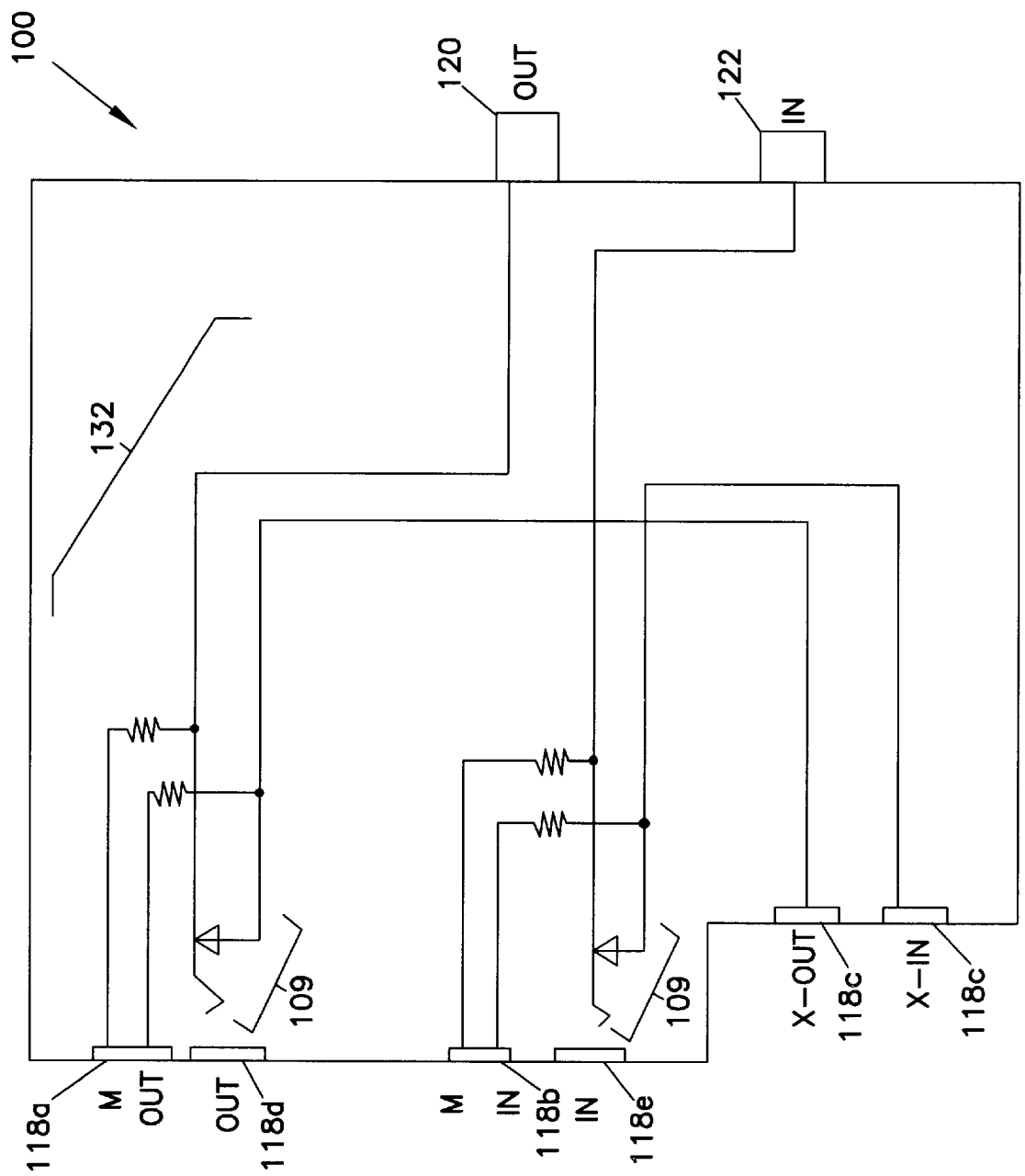
FIG. 6A is a schematic diagram of an electrical circuit of a switching

FIG. 6A shows a schematic diagram of the electrical circuit 132 of switching jack module 100. In a digital signal cross-connect (dsx) module, typically the rear connectors 120 and 122 are connected to cables leading to remote equipment. The connectors 120 and 122 are electrically connected to cross-connect ports 118c. The cross-connect ports 118c are connected by jumper cables to cross-connect ports of another cross-connect module. The access ports 118d and 118e may be periodically used to interrupt the signal passing between the cross-connect ports 118c and the connectors 120 and 122 and to switch (via switches 109) the signals to pass through cables inserted into the access ports 118d and 118e. The monitor ports 118a and 118b may be used to monitor the signals passing through the module. The preferred embodiment shown in the figures incorporates BNC connectors 120 and 122. It is to be understood that the present invention may incorporate many other types of connectors, for example TNC, 1.6/5.6, Type 43, twisted pair connectors including DB style, or ribbon styles, or other cable connectors such as fiber optic connectors. The present invention may be employed to slidably mount many types of connectors such as ports 118. The ports may be slidably mounted to a panel or chassis system with or without additional connectors on an opposing surface or panel.

Side surfaces 114 and 116 both define guide-slots 160 and 162. The guide-slots are characterized by a length which lies parallel to the direction the connectors 120 and 122 slide when transitioning between the first position and the second position.

Figure 8:
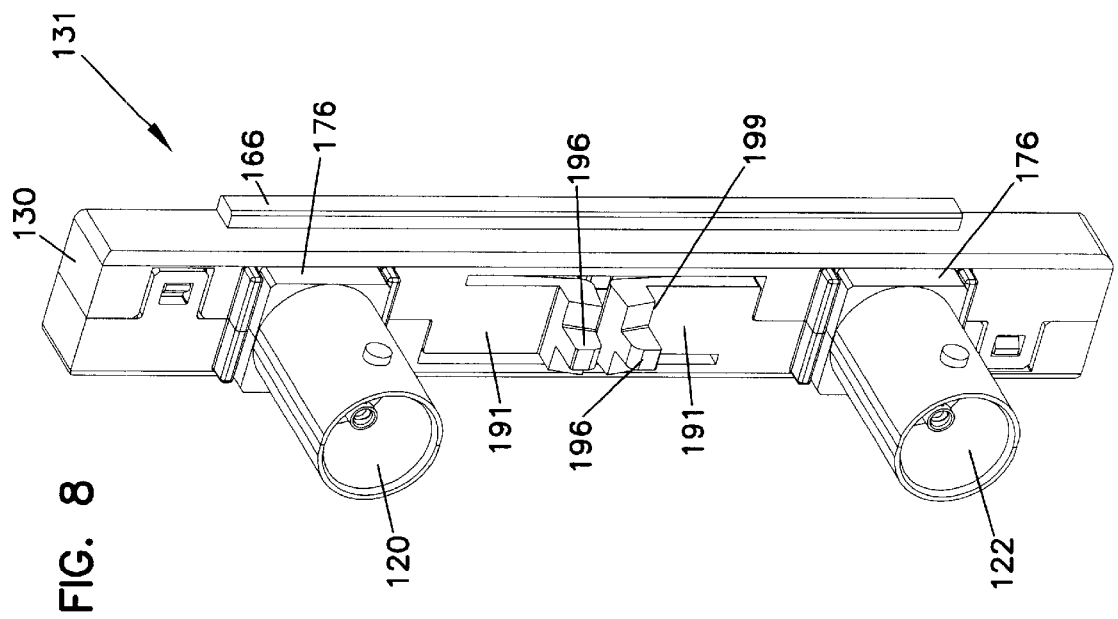
FIG. 8 is front perspective view of a connector carriage assembly according to the present invention.
Figure 9:
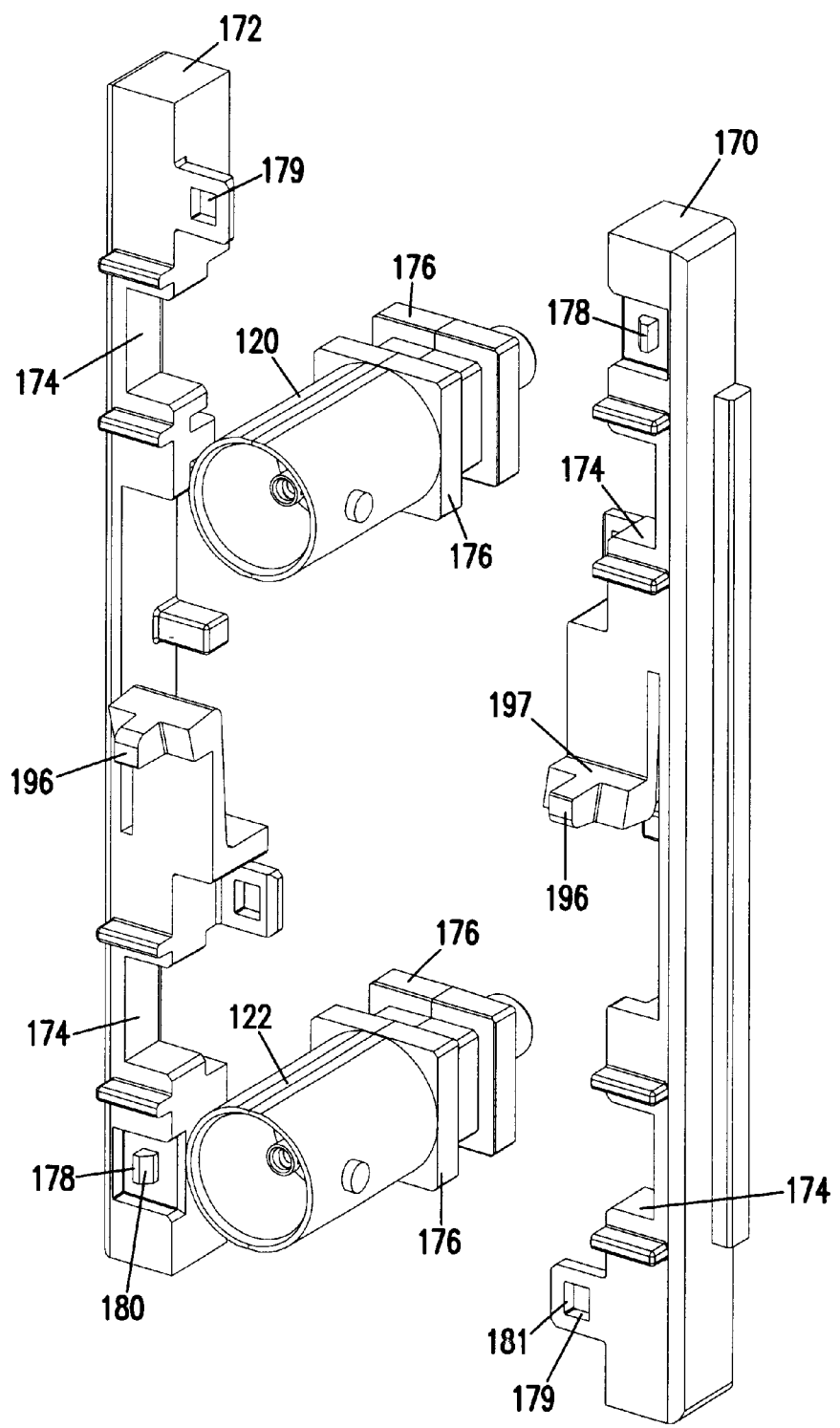
FIG. 9 is an exploded view of the connector carriage assembly of FIG. 8.

Referring now to FIGS. 8 and 9, a carriage 130 is shown for supporting the connectors 120 and 122. The carriage 130 slides with the connectors 120 and 122 within the connector housing 105. The carriage 130 may include guide members such as guiderails 164 and 166. The guiderails 164 and 166 are received in guide-slots 160 and 162 of the connector housing 105 to retain the carriage 130 within the housing and guide the carriage 130 as it transitions between first and second positions. The carriage 130 and housing 105 could be reconfigured so that the carriage 130 defines the guide-slot which receives a guiderail or other guide member included in the connector housing.

As shown in FIG. 9, in the preferred embodiment the carriage assembly 131 includes a carriage 130 and connectors 120 and 122. The carriage 130 includes first and second carriage members 170 and 172. Carriage members 170 and 172 define recesses 174 for receiving a connector therein. Connectors 120 and 122 are trapped between carriage members 170 and 172 in recesses 174. Connectors 120 and 122 may include collars 176 spaced apart along the connectors. The recessed portion of carriage members 170 and 172 may then be received between the connector collars 176 to prevent the connectors from being axially removed from the carriage 130. received by eyes 179 so that the retaining edge 181 retains the carriage members 170 and 172 in a mating arrangement trapping the connectors 120 and 122 between them. Carriage 130 may be made of plastic. As can be seen in the FIG. 9, carriage member 170 is configured so that an identically shaped carriage member when rotated 180 degrees can be coupled to carriage member 170 in a mating arrangement. Carriage member 172, is actually identical to carriage member 170, only carriage member 172 is turned 180 degrees to be in a mating position relative to carriage member 170. By configuring the carriage members in this way, both carriage members 170 and 172 may be formed in the same mold, reducing the number of different parts used in the assembly.

Alternatively, snaps, tabs, slots, inserts, tabs or other engaging edges could be used to secure carriage members 170 and 172 in a mating arrangement. Also, the carriage could be a single molded piece instead of two, for example the carriage could be injection molded around a connector. Carriage 130 in the figures receives two connectors 120 and 122, but alternative embodiments could include single connector carriages receiving only one connector which would allow each individual connector to be positioned independently of other connectors. The carriage 130 could be configured to receive more than two connectors. The connector housing could also be configured with a larger connector window or multiple connector windows to allow the carriage and connectors to be positioned in more than two positions. For example, a three position system could include an intermediate position, an upper position, and a lower position.

Referring now to FIG. 5, the connector housing 105 defines first and second apertures 190 and 192 connected by a channel 194. Carriage 130 includes a protruding tab 196 received in the first aperture 190. The protruding tab extends from a flexible lever 191. The protruding tab 196 includes edges 197 and 199 which retain the carriage 130 and the connectors 120 and 122 in the first position by opposing edges of the apertures of the connector housing 105. The protruding tab 196 is depressible so that when depressed, the carriage 130 and connectors 120 and 122 may slide to the second position (shown in FIGS. 1 and 3). In the second position, protruding tab 196' is received in the second aperture 192 thereby retaining the carriage 130 and connectors in the second position.

Alternatively, the assembly may not include a means for retaining the carriage and connectors in the selected position. Instead, the present invention could be used during installation to slide the connectors from an initial position into a more accessible position in order to connect or disconnect a cable to or from the connector. Then the connector could be allowed to slide back down into its original position.

The carriage and connector housing could be configured with various opposing edges in order to retain the carriage and connectors in a selected position. These could include engaging tabs and slots, push-and-slide, or pull-and-slide mechanisms. FIGS. 10–19 show examples of alternatives for achieving this.

FIG. 10 shows a connector assembly 200 including a carriage 230 with a single protruding tab 235 which can be transitioned between first and second apertures 238 and 240 in connector housing 215 by either depressing or pulling tab 235 from aperture 238 and sliding the carriage 230 with the connectors 210 and 220. FIG. 11 shows two modules according to the embodiment of FIG. 10 with the connectors arranged in a staggered pattern.

FIG. 12 shows a connector assembly 300 including a carriage 330 with connectors 310 and 320. Connector housing 315 defines a fastener hole 340 which receives a fastener 350. Fastener 350 may be inserted into hole 340 to secure the carriage 330 in a selected position, fastener 350 may then be removed to allow carriage and connectors to transition to a different position as shown in FIG. 13.

FIG. 14 shows a connector assembly 400 including a carriage 430 with connectors 410 and 420. Connector housing 415 defines an fastener aperture 455 and 460 for both first and second positions. Carriage 430 may define a mating fastener receptacle which is aligned beneath aperture 455 when the carriage 430 is in the a first position and which is aligned beneath aperture 460 when the carriage 430 is in a second position. Fastener 450 may be inserted through connector housing 415 into the fastener receptacle to retain the carriage 430 in a selected position. FIG. 15 show two assemblies according to the embodiment of FIG. 14 in a staggered arrangement.

FIG. 16 shows a connector assembly 500 including a carriage 530 with connectors 510 and 520. Connector housing 515 defines a slot 540. Slot 540 receives fastener 560 which may be tightened to retain carriage 530 and connectors in a selected position or which may be loosened to allow the carriage to slide and transition to a new position. FIG. 17 shows two assemblies according to the embodiment of FIG. 15 in a staggered arrangement.

FIG. 18 shows a connector assembly 600 including a carriage 630 and connectors 610 and 620. In the embodiment of FIG. 18, the connectors themselves act as the depressible element to allow transitions between positions. The connectors when depressed would disengage interior features of the connector housing to allow transitions between positions. Connector 620 is shown depressed indicating that connector 620 may be transitioned to another position. FIG. 19 shows two assemblies according to the embodiment of FIG. 18 in a staggered arrangement.

By using two connector housings that include slidable connectors according to the present invention, a staggered arrangement of connectors can be achieved. The method would include the step of sliding a slidable connector into a position on a first module and placing the first module adjacent a second module with a connector in a different position. Alternatively, the two modules could first be placed next to each other and then one sliding connector would be slid to a staggered position relative to the connector in the second module.

The present invention can be employed in various applications. The invention is not limited to the preferred embodiment disclosed herein. For example, the connector housing may be any panel having a flat surface in which connectors are disposed. Having described the present invention in its preferred embodiment, modifications and equivalents may occur to one skilled in the art. It is intended that such modifications and equivalents shall be included within the scope of the claims which are appended hereto.

What is claimed is:

1. A connector assembly for connecting to a cable, the connector assembly comprising:
    a connector housing having a planar surface, the planar surface defining at least one connector window lying in first plane;
    a connector received in the connector window of the planar surface, wherein the connector is slidable parallel to the first plane between a first position and a second position within the connector window;
    a carriage which receives the connector, the carriage being slidable with the connector between the first position and the second position relative to the connector housing;
    wherein the connector housing defines first and second apertures, and wherein the carriage includes a protruding tab received by the first aperture when the carriage and connector are in the first position thereby retaining the carriage and connector in the first position, the tab being received by the second aperture when the carriage and connector are in the second position thereby retaining the carriage and connector in the second position.

2. The connector assembly of claim 1 wherein the protruding tab is depressible so that the carriage and connector may slide between the first and second positions.

3. A connector assembly for connecting to a cable, the connector assembly comprising:
    a connector housing having a planar surface, the planar surface defining at least one connector window lying in first plane;
    a connector received in the connector window of the planar surface, wherein the connector is slidable parallel to the first plane between a first position and a second position within the connector window;
    a carriage which receives the connector, the carriage being slidable with the connector between the first position and the second position relative to the connector housing;
    wherein the carriage includes first and second members, wherein both the first and second members include means for engaging the other member in a mating arrangement, the first and second members defining recesses for receiving and trapping the connector between the first and second members when the first member is engaged with the second member, both the first and second members including a guiderail.

4. The connector assembly of claim 3 wherein the means for engaging the members of the carriage in mating arrangement include a post and eye, the post having a ramped surface.

5. A connector carriage assembly comprising:

first and second opposed carriage members, wherein the first and second carriage members each define a plurality of recesses, the first carriage member defining a tab having a ramped surface, the second carriage member defining a retention edge engaging the tab of the first carriage member so that the first and second carriage members are retained in a mating arrangement, wherein when the carriage members are in the mating arrangement each recess defined by the first member opposes a recess defined the second carriage member;

a plurality of connectors received by and trapped between the recesses of the first and second carriage members.

6. The carriage assembly of claim 5 wherein the connectors include first and second collars spaced apart along the connector, and wherein one of the first and second carriage members is received between the first and second collars of the connectors.

7. The carriage assembly of claim 5 wherein at least one of the first and second carriage members includes a depressible tab.

8. The carriage assembly of claim 5 wherein the first and second carriage members are identical and made of plastic.

9. A connector assembly for connecting to a cable, the connector assembly comprising:

a connector housing having a front, and two sides surfaces, the two side surfaces each defining a guide-slot parallel to the front surface, the front surface defining first and second connector windows and first and second tab apertures;

a carriage defining first and second connector apertures, the carriage including first and second guiderails on opposite sides of the carriage, the carriage received in the connector housing so that the guiderails are slidably disposed within the guide-slots of the connector housing, the carriage being slidable between first and second positions relative to the connector housing, the carriage defining a depressible tab, when the carriage is in the first position the tab is received in the first tab aperture thereby retaining the carriage in the first position, when the carriage is in the second position the tab is received in the second tab aperture thereby retaining the carriage in the second position;

first and second connectors received in the first and second connector apertures respectively and slidably received in the first and second connector windows of the connector housing, wherein when the depressible tab is depressed the connectors may slide with the carriage between first and second positions relative to the connector housing.

10. A connector assembly comprising:

a housing having first and second opposed panels, the first panel having a plurality of connectors disposed therein, the second panel having a plurality of connectors disposed therein, the connectors in the second panel being slidable between a set of first positions and a set of respective second positions relative to the housing, the set of first positions being displaced from the set of respective second positions to selectively allow a staggered or unstaggered arrangement of connectors to be formed relative to connectors in adjacent connector assemblies;

wherein the connectors in the first panel are electrically connected to the slidable connectors disposed in the second panel.

11. The connector assembly of claim 10 wherein the connectors in the first panel are ports, the ports including an access port, a monitor port, and a cross-connect port.

12. The connector assembly of claim 11 wherein the ports are electrically coupled to the connectors by a switching circuit.

13. The connector assembly of claim 10 further comprising a carriage which receives a plurality of the slidable connectors, the carriage being slidable with the connectors.

14. The connector assembly of claim 13 further comprising means for retaining the carriage and in a selected position.

15. A method for arranging a plurality of connectors into a staggered arrangement, the method comprising:

providing a first connector assembly having a first connector disposed therein, the first connector being slidable between a first and a second position, the first connector being constrained so that it slides only along one direction;

providing a second connector assembly having a second connector disposed therein, the second connector being slidable between a first and second position, the second connector being constrained so that it slides only along one direction;

placing the first connector assembly adjacent the second connector assembly; sliding one of the connectors into a position different from the position of the other connector to produce a staggered arrangement of connectors.

16. The method of claim 15 further comprising the step of sliding the second connector into a selected position.

17. The method of claim 15 wherein the step of sliding one of the connectors is performed after the step of placing the first connector assembly adjacent the second connector assembly.

18. The method of claim 15 further comprising the step of locking the slid connector in position.

* * * * *